(12) United States Patent
Vaillant

(10) Patent No.: US 6,404,843 B1
(45) Date of Patent: Jun. 11, 2002

(54) METHOD OF RECONSTRUCTION OF A THREE-DIMENSIONAL IMAGE OF ELEMENTS OF SHARP CONTRAST

(75) Inventor: Régis Vaillant, Villebon sur Yvette (FR)

(73) Assignee: GE Medical Systems, S.A. (FR)

( * ) Notice: Subject to any disclaimer, the term of this patent is extended or adjusted under 35 U.S.C. 154(b) by 0 days.

(21) Appl. No.: 09/666,997

(22) Filed: Sep. 21, 2000

(30) Foreign Application Priority Data

Sep. 27, 1999 (FR) .............................................. 99 12004

(51) Int. Cl.[7] .................................................. A61B 6/03
(52) U.S. Cl. .............................. 378/8; 378/4; 378/98.11
(58) Field of Search ......................... 378/4, 8, 15, 98.11

(56) References Cited

U.S. PATENT DOCUMENTS

| | | | |
|---|---|---|---|
| 5,166,961 A | | 11/1992 | Brunnett et al. ............... 378/19 |
| 5,563,962 A | * | 10/1996 | Peters et al. ................. 382/261 |
| 5,592,571 A | * | 1/1997 | Peters ......................... 382/130 |
| 5,715,334 A | * | 2/1998 | Peters ......................... 382/130 |

FOREIGN PATENT DOCUMENTS

| | | |
|---|---|---|
| EP | 0331274 | 9/1989 |
| EP | 0377386 | 7/1990 |
| EP | 0429191 | 5/1991 |
| EP | 0932669 | 9/1996 |
| EP | 0840253 | 5/1998 |
| FR | 8803606 | 9/1990 |
| FR | 8916906 | 6/1991 |
| FR | 9610774 | 3/1998 |

OTHER PUBLICATIONS

Gordon et al, "Algebriac Reconstruction Techniques For Three–Dimensional Electron Microsoft and X–Ray Photography", J. Theo. Biol., pp. 471–481, (1970).
Feldkamp et al, "Practical Cone. Beam Algorithm", J. Optical Soc. of America, vol. 1, No. 6, Jun. 1984, pp. 612–619.
Jahna, "Fundamentals of Digital Image Processing", Prentice Hall Information and System Science Series, Sep. 1998, Chapter 8.
Wahle et al, "Geometrically Correct 3–D Reconstruction of Intravascular Ultrasound Images by Fusion With B1–Plane Angiogram—Methods and Validation", IEEE Trans. on Medical Imaging, Arg 1999, vol. 18, No. 8 pp. 686–699.

* cited by examiner

*Primary Examiner*—David V. Bruce
(74) *Attorney, Agent, or Firm*—Jay L. Chaskin

(57) ABSTRACT

The invention concerns a method of reconstruction of a three-dimensional image of elements of sharp contrast from a set of two-dimensional images of an object comprising the elements of sharp contrast. For each different position of an X-ray camera around the object, a two-dimensional image is taken, and the use of an algorithm for reconstruction of the three-dimensional image is preceded by a stage of filtering of the set of two-dimensional images.

16 Claims, 7 Drawing Sheets

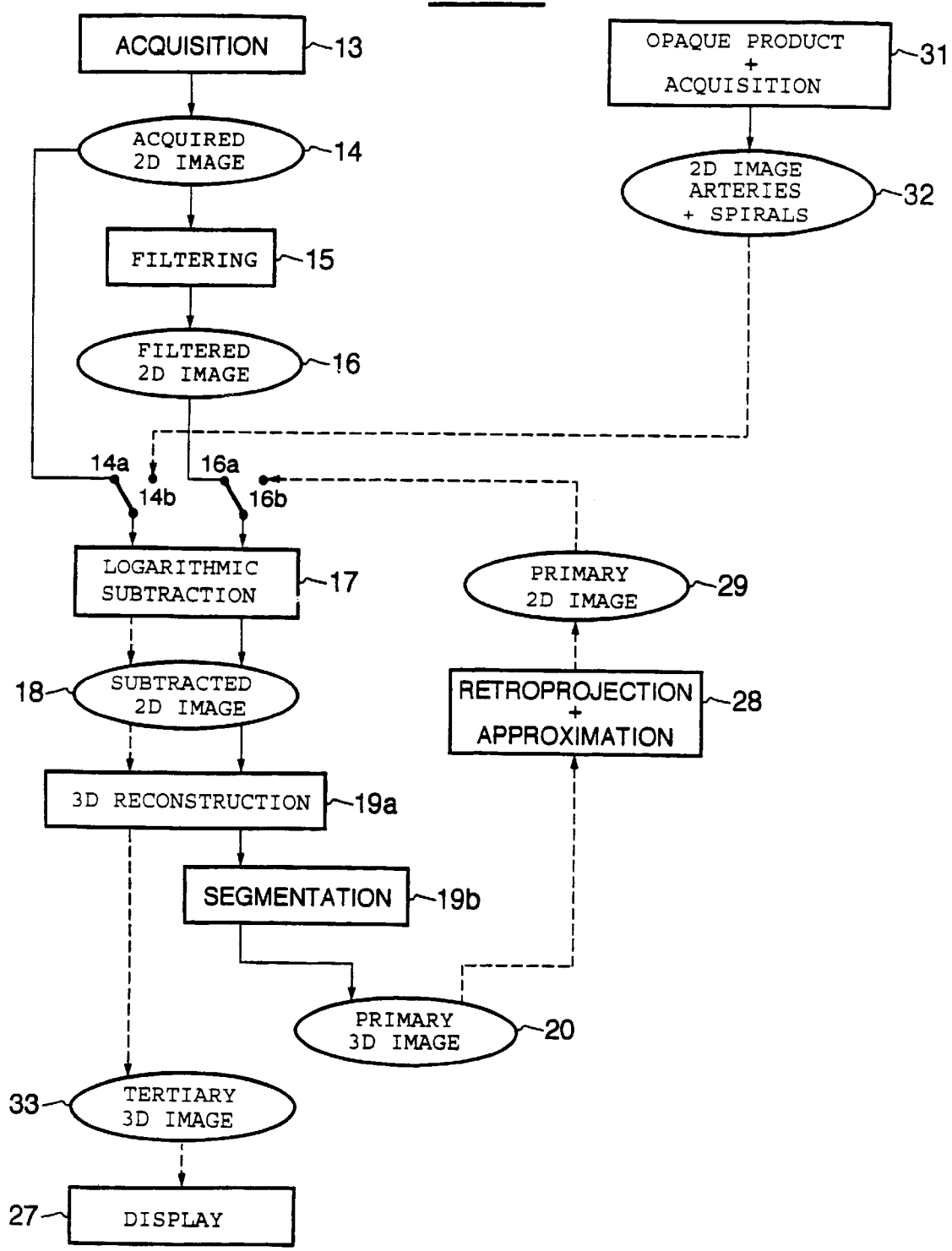

METHOD OF RECONSTRUCTION OF A THREE-DIMENSIONAL IMAGE OF ELEMENTS OF SHARP CONTRAST

BACKGROUND OF THE INVENTION

The present invention concerns a method of reconstruction of a three-dimensional image of elements of sharp contrast, in particular, a prosthesis present in a patient's artery, from a set of two-dimensional images of the patient obtained for different positions of a camera.

In the medical field, reconstruction of the patient's internal structures under examination is undertaken, with reconstruction, in particular, of angiographic images, that is, obtaining images of opacified vascular systems by injection of a contrast medium.

The two-dimensional projected images of a patient are obtained by rotation of the X-ray camera around the patient. As is common in angiography. each acquired image is a subtracted image which, for example, is obtained by a standard technique of logarithmic subtraction of two X-rays taken at the same angle of incidence before and after an injection of a contrast medium into the vascular system whose three-dimensional image it is desired to reconstruct.

A three-dimensional reconstruction algorithm is then made from two-dimensional projected images of the object in order to reconstruct the three-dimensional volume.

There are several types of reconstruction algorithms in X-ray imagery. One can cite, notably, the article by Gordon, Bender and Herman entitled "Algebraic Reconstruction Techniques (ART) for Three-Dimensional Electron Microscopy and X-ray Photography," *Journal Theo. Biol.* 29, pages 471 to 481 (1970); the article "Practical cone-beam algorithm," L. A. Feldkamp, L. C. Davis and J. W. Kress, *Journal Optical Society of America,* vol. 1, no. 6, June 1984, pages 612–619; as well as the work by Anil K. Jain, entitled "Fundamentals of digital image processing," Prentice Hall Information and System Sciences Series, Thomas Kailath Series Editor; Sep. 1988 or also French Patent Applications No. 89 03606, No. 89 16906 or No. 9610774, to which the reader is invited to refer.

Now, such angiographic image reconstruction makes it possible to visualize solely the arteries in which an opaque medium has been introduced, it does not make possible the visualization of other elements of interest, such as prostheses.

BRIEF DESCRIPTION OF THE INVENTION

The invention is intended to remedy this problem by proposing a method which permits the visualization of prostheses in three dimensions.

An embodiment of the invention permits the visualization of prostheses and arteries on the same screen according to their actual arrangement.

The invention therefore proposes a method of reconstruction of a three-dimensional image of elements of sharp contrast from a set of two-dimensional images of an object comprising the elements of sharp contrast. For each different position of an X-ray camera around the object, a two-dimensional image is taken, and the use of an algorithm for reconstruction of the three-dimensional image is preceded by a stage of filtering of the set of two-dimensional images.

The three-dimensional image obtained only contains the elements of sharp contrast.

The camera can supply only one series of two-dimensional images, in which case no opaque medium is used, but it can also supply two series of two-dimensional images obtained by two acquisition sequences intercalated with an injection of opaque medium into the arteries. The two series of images can be used for a possible angiographic reconstruction and the first series can be used for the reconstruction of a three-dimensional image of elements of sharp contrast according to the invention.

According to an advantageous characteristic of the invention, the filtering of each acquired two-dimensional image is of low-pass type, so as to obtain a filtered two-dimensional image no longer containing the elements of sharp contrast. After filtering, a logarithmic substraction is carried out between that image no longer containing the elements of sharp contrast and the acquired two-dimensional image, in order to maintain only the elements of sharp contrast.

More precisely low-pass filtering on an acquired two-dimensional image consists of:

taking the acquired two-dimensional image, determining its average, expanding the acquired two-dimensional image in order to eliminate undesired objects of sharp contrast and small size in relation to the elements of sharp contrast, and taking the maximum between the acquired two-dimensional image expanded and the average of the acquired two-dimensional image, in order to obtain a filtered two-dimensional image lacking any element and object of sharp contrast.

According to an advantageous embodiment of the invention, the elements are prostheses such as coils placed in a patient's artery or even vascular clips Preferably, after the reconstruction of three-dimensional images containing prostheses, a hysteresis segmentation of that three-dimensional image is made, so as to eliminate unnecessary voxels and to solely visualize the prostheses in a primary three-dimensional image.

According to an advantageous variant of the invention, for each prosthesis:

a back projection of the primary three-dimensional image is made on the acquired two-dimensional images in order to determine the pixels representing the prosthesis on these images, an approximation is made by replacing the intensity of each of those pixels with an intensity determined from the intensities of the neighboring pixels in order to obtain primary two-dimensional images lacking the prosthesis, a logarithmic subtraction is made between the primary two-dimensional images lacking the prosthesis and the respective acquired two-dimensional images, so as to obtain new two-dimensional images solely containing the prosthesis, and a three-dimensional image reconstruction is made, followed by an hysteresis segmentation from new two-dimensional images, in order to obtain a secondary three-dimensional image solely containing the prosthesis.

This variant advantageously makes it possible to obtain a secondary three-dimensional image in which the coils present more precise intensity levels or gray levels.

In an embodiment of the invention, an angiographic three-dimensional image reconstruction of the arteries is made independently and merging is carried out between the primary or secondary three-dimensional image containing the prosthesis and the three-dimensional image containing arteries so as to obtain a merged three-dimensional image showing the spatial distribution between the arteries and the prosthesis.

According to an advantageous embodiment, in the course of merging, when a voxel in the three-dimensional image containing the arteries has an intensity different from the one having the equivalent voxel in the three-dimensional image containing the prosthesis, the highest intensity is attributed to the voxel resulting from merging.

Advantageously, before merging of the primary or secondary three-dimensional image containing the prosthesis with the three-dimensional image containing the arteries, voxels having a low attenuation value are eliminated on the three-dimensional image containing the arteries by maintaining only a predetermined number of voxels of high attenuation value.

According to another advantageous variant of the invention, for each prosthesis:

a back projection of the primary three-dimensional image is made on the acquired two-dimensional images in order to determine pixels representing the prosthesis on those images, an approximation is made by replacing the intensity of each of those pixels with an intensity determined from the intensities of the neighboring pixels in order to obtain primary two-dimensional images lacking the prosthesis, a logarithmic subtraction is made between the primary two-dimensional images lacking the prosthesis and two-dimensional images containing the arteries and the prosthesis acquired after injection of the medium opaque to X-rays, so as to obtain new two-dimensional images containing the arteries and the prosthesis, and a three-dimensional image reconstruction is made from the new two-dimensional images in order to obtain a tertiary three-dimensional image containing the arteries and the prosthesis.

The operation of merging two three-dimensional images is thus avoided.

BRIEF DESCRIPTION OF THE DRAWINGS

Other advantages and characteristics of the invention will appear on examination of the detailed description of a nonlimitative embodiment and of the attached drawings, in which:

FIG. 8 is a flow chart of another advantageous embodiment of the method.

DETAILED DESCRIPTION OF THE INVENTION

Figure 1:
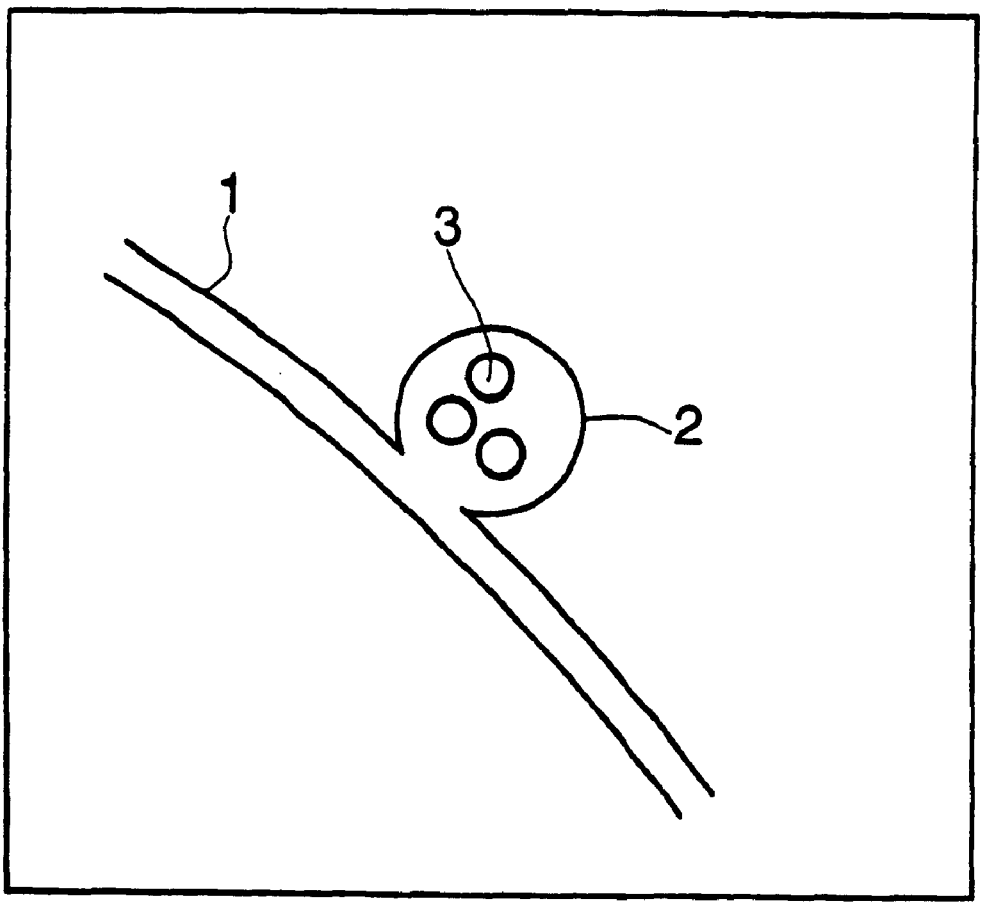
FIG. 1 is an image of an artery containing an aneurysm in which coils are lodged.

FIG. 1 illustrates an artery 1 containing an aneurysm 2 in a patient's head. The blood passing into the artery 1 is lodged in the aneurysm 2, which forms a pocket in which the pressure tends to increase. To limit that increase in pressure, coils 3 are placed in the aneurysm 2. The coils 3 are made with the aid of materials capable of forming blood clots, which makes possible a drop of pressure in the aneurysm 2. It is desired to visualize the coils thus placed.

Figure 2:
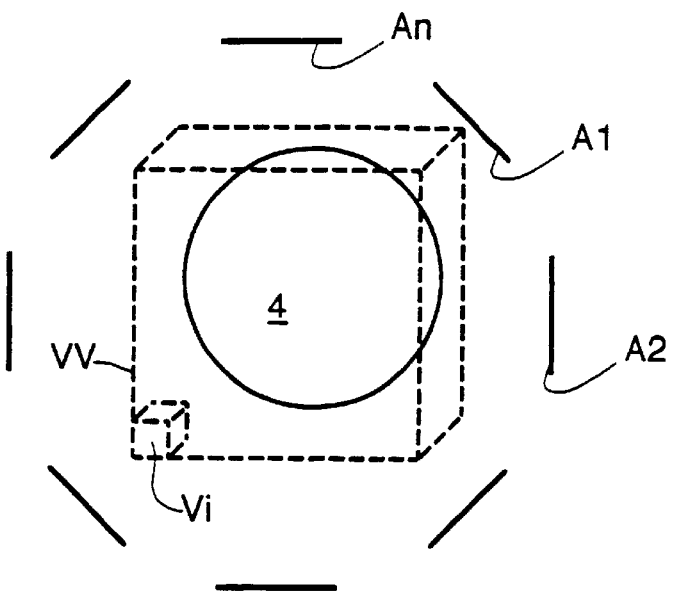
FIG. 2 schematically illustrates a set of two-dimensional projected images around an object.
Figure 3:
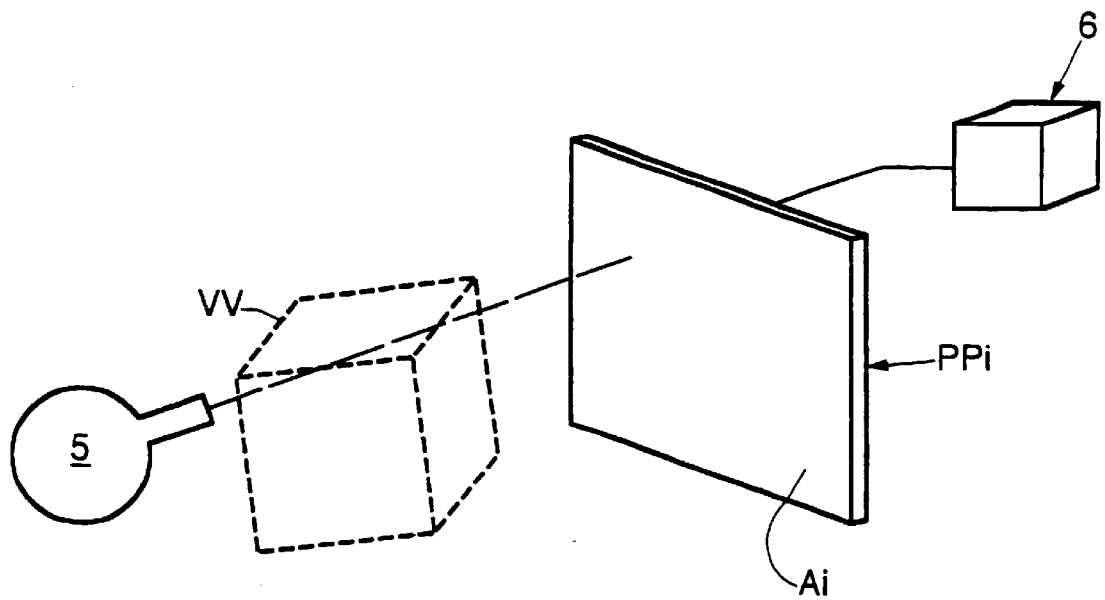
FIG. 3 illustrates in greater detail the acquisition of one of these two-dimensional projected images.

Referring, to FIGS. 2 and 3, in particular, it can be seen that the imaging system usable for applying the invention makes it possible to obtain a set of two-dimensional acquired images Al–An, obtained in this case by 180° rotation around the patient's head 4 of an X-ray source 5.

Each acquired image Ai is obtained from a two-dimensional radiation detector, for example, of the luminance amplifier type used in radiology, placed opposite the X-ray tube in a plane called projection plane PPi. The different projection planes are obtained by the different angular positions of the detector rotating around the patient's head. The detector is connected to processing means 6 containing, notably, sampling means connected to a microprocessor incorporating in its associated program memory software the image reconstruction algorithm used in the invention and, in general, all of the functional means making it possible to employ the method according to the invention.

A calibration of the imaging system makes it possible, notably, to define a virtual volume VV surrounding the object 4 and broken down into elementary volume elements Vi or "voxels". It is possible to use a known method of automatic geometric calibration of an X-ray imaging system, such as that described in French Patent Application No. 93 00804.

Figure 4A:
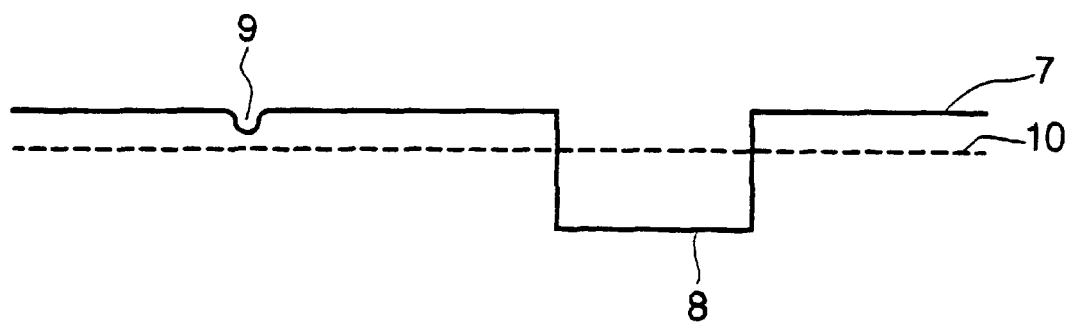
FIGS. 4a, 4b and 4c illustrate a low-pass filtering operation according to an embodiment of the invention.
Figure 4B:
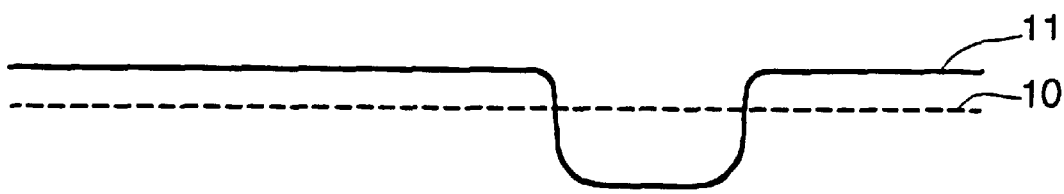
Figure 4C:

FIGS. 4a, 4b and 4c schematically illustrate different stages included in the low-pass filtering operation according to the invention. Curve 7 in FIG. 4a represents. for example, the X-ray intensity received at the detector 6 by a line of pixels for an acquired two-dimensional image. Zone 8 corresponds to a drop in intensity due to the presence of coils 3 in the X-ray beam. The coils 3 are endowed with so sharp a contrast that they absorb a good portion of the intensity of X-rays crossing them. The acquired image can contain some undesired objects of sharp contrast, noise in other words. One of these undesired objects is represented by a small gap 9. The dotted line 10 represents the average intensity of the image on that line of pixels.

Curve 11 in FIG. 4b is the result of an expansion operation undergone by curve 7 of FIG. 4a. The expansion operation, well known to one skilled in the art, consists of taking each point of curve 7 and replacing its intensity with a maximum intensity of the neighboring points. Gap 9 disappears and gap 8 is slightly trimmed.

Curve 12 in FIG. 4c is the maximum between curve 7 and the average 10. Curve 12 is the final result of low-pass filtering. It corresponds to an acquired image that would be obtained in case the patient does not have any element of sharp contrast. The two-dimensional image obtained no longer contains the coils 3.

Figure 5:
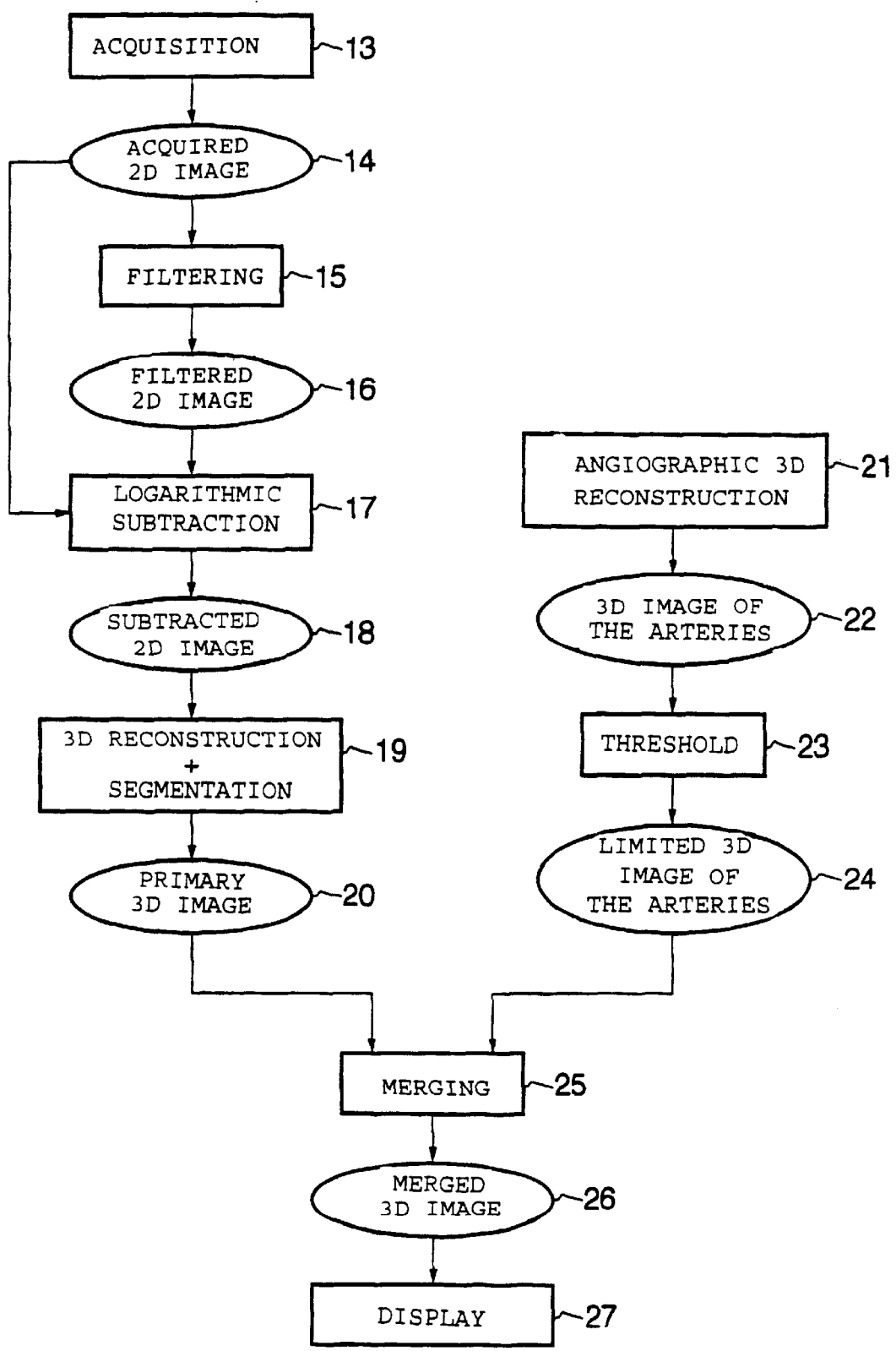
FIG. 5 is a flow chart of an embodiment of the method.

FIG. 5 is a flow chart in which stages of the method according to the invention are represented in rectangular form and the products of those stages, in this case images, are represented in elliptical form. The imaging system makes possible the acquisition 13 of a set of two-dimensional images 14 by rotation of the source 5 around the patient's head. For each different position of the source 5 around the patient's head, a single two-dimensional image is taken. The coils 3, endowed with a sharp contrast, are clearly visible on the two-dimensional images 14. Some sharply contrasted undesired objects are also possibly present on the two-dimensional images 14.

Each acquired two-dimensional image 14 undergoes a low-pass filtering 15. The filtered two-dimensional image 16 contains neither the coils 3 nor the undesired objects of sharp contrast. Then, in order to obtain a two-dimensional image containing only elements of sharp contrast, a logarithmic subtraction 17 is made between the acquired two-dimensional image 14 and the filtered two-dimensional image 16. The subtracted image 18 contains the coils 3 and the possible undesired objects of sharp contrast. The three-dimensional reconstruction makes it possible to obtain a three-dimensional image from the set of two-dimensional subtracted images 18.

One uses a reconstruction of the three-dimensional image from acquired two-dimensional images and, for example, an iterative algorithm of algebraic image reconstruction. A first iteration of the algorithm is made with a predetermined initial image resolution so as to obtain, following that first iteration, first density values for the voxels of the virtual volume VV determined on calibration of the camera. At least a portion of said voxels of the virtual volume is subdivided into several sets corresponding respectively to different image resolutions that are multiples or submultiples of the initial resolution. And, within each following iteration of the algorithm, said algorithm is successively applied from each of set sets of voxels.

One skilled in the art will easily understand that other methods of three-dimensional image reconstruction can be used.

In other words, the iterative algorithm of algebraic image reconstruction is applied on a multiresolution volume. In that volume, voxels are selected which are a priori representative of objects of interest to be visualized and they are divided so as to increase the resolution. The other voxels, which are of less interest, for they do not directly concern the objects to be visualized, are either left identical or are regrouped at least once so as to diminish the resolution volume, but they are, nevertheless, used for image reconstruction calculations, which makes it possible to obtain in the end images of very good quality in a short calculation time.

In the course of stage 19, an hysteresis segmentation operation is also carried out following three-dimensional reconstruction. Segmentation uses the hysteresis threshold technique, which consists of selecting all the voxels having an intensity greater than a low threshold, 0.012, for example, such that the associated connected zone includes at least one voxel with an intensity greater than a high threshold, 0.025, for example. Furthermore, the total number of voxels in the connected zone should be greater than a predefined minimum number, 100, for example. A connected zone concerning a given property P, which can be the fact that a voxel possesses an intensity higher than a given threshold, is defined as a maximum set of voxels, so that it is possible to go from any voxel of the connected zone to any other voxel of the connected zone by a path which includes only voxels having property P. The predefined minimum number is a minimum number of voxels in the connected zone chosen, so as to reject a number of voxels due to artifacts at the limits of the field of vision. Segmentation makes it possible to eliminate unnecessary voxels, such as those concerning the undesired objects of sharp contrast.

The image obtained after segmentation is a primary three-dimensional image 20 representing the coils 3 in three dimensions.

Furthermore, an angiographic three-dimensional image reconstruction 21 is made in order to obtain a three-dimensional image 22 containing the patient's arteries. The angiographic three-dimensional image reconstruction 21 is made in standard fashion from two-dimensional images obtained by a double acquisition separated by an injection of opaque medium into the arteries.

In stage 23, a threshold is applied on the three-dimensional image 22 in order to eliminate unnecessary voxels, that is, those possessing a low intensity, and to obtain a limited three-dimensional image 24. A number coming, for example, within a nonlimitative range of 1 to 5 million voxels having the greatest intensities can be maintained.

A merging of three-dimensional images 20 and 24 is carried out in stage 25 in order to obtain merged image 26. When, in the limited three-dimensional image 24, a voxel contains a limited intensity different from that of an equivalent voxel, that is, of the same coordinates, in the primary three-dimensional image 20, the highest intensity is attributed to the equivalent voxel in the merged image 26.

Stage 27 makes it possible to visualize a three-dimensional image in which the coils 3 and the arteries can be distinguished.

Figure 6:
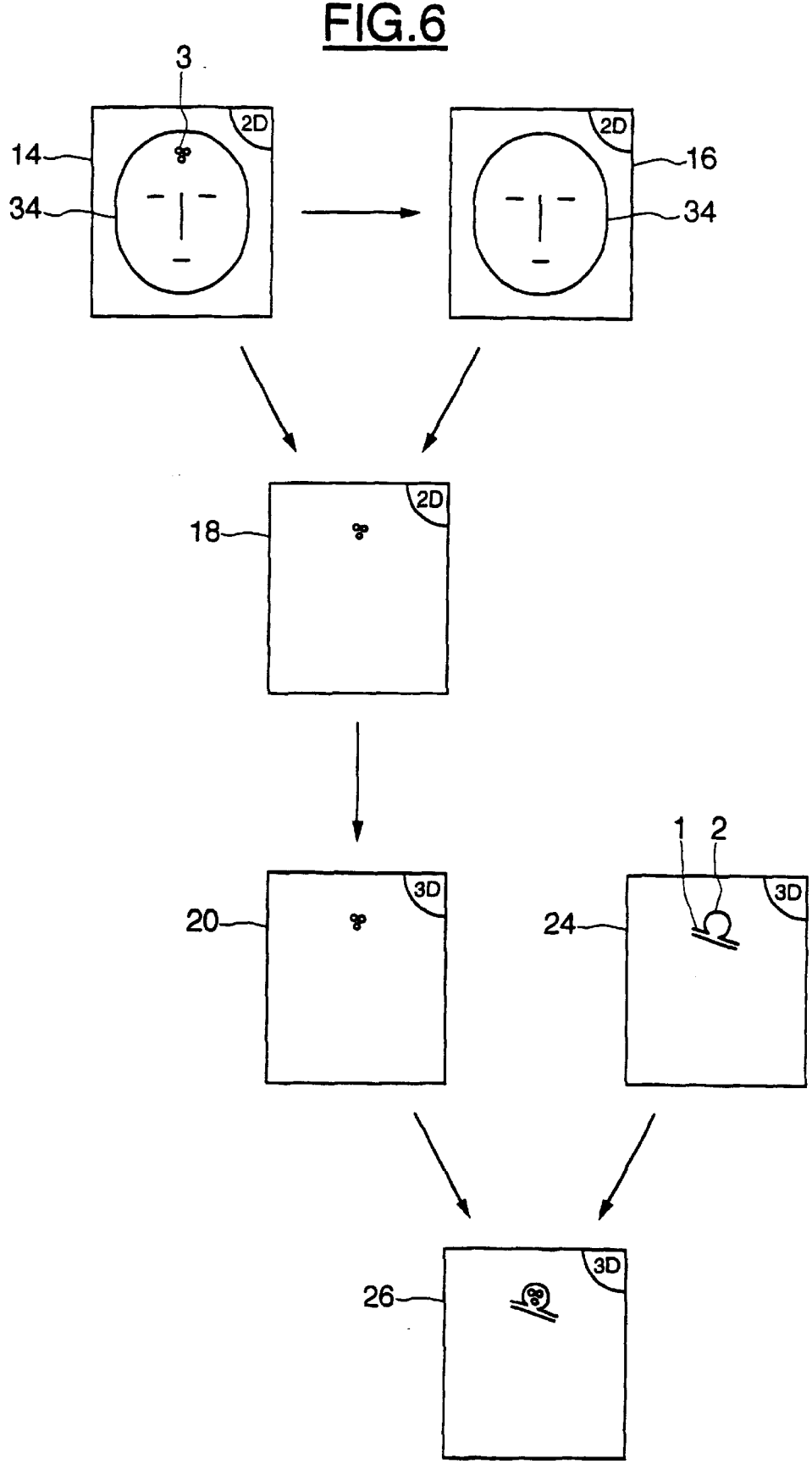
FIG. 6 is a schematic illustration of the method illustrated in the flow chart of FIG. 5.

FIG. 6 very schematically shows the different images obtained in the course of the method illustrated by the flow chart of FIG. 5. The acquired two-dimensional image 14 contains the patient's head 34 in which the coils 3 are present. Low-pass filtering 15 produces a two-dimensional image 16 not containing any coils 3. Logarithmic subtraction 17 between these two images 14 and 16 leads to the subtracted two-dimensional image 18 solely containing the coils 3. Three-dimensional reconstruction and segmentation 19 lead to the primary three-dimensional image 20. The primary three-dimensional image 20 and the three-dimensional image 24 obtained by angiographic three-dimensional image reconstruction are merged to create the three-dimensional merged image 26 containing the coils 3, the artery 1 and the aneurysm 2.

Figure 7:
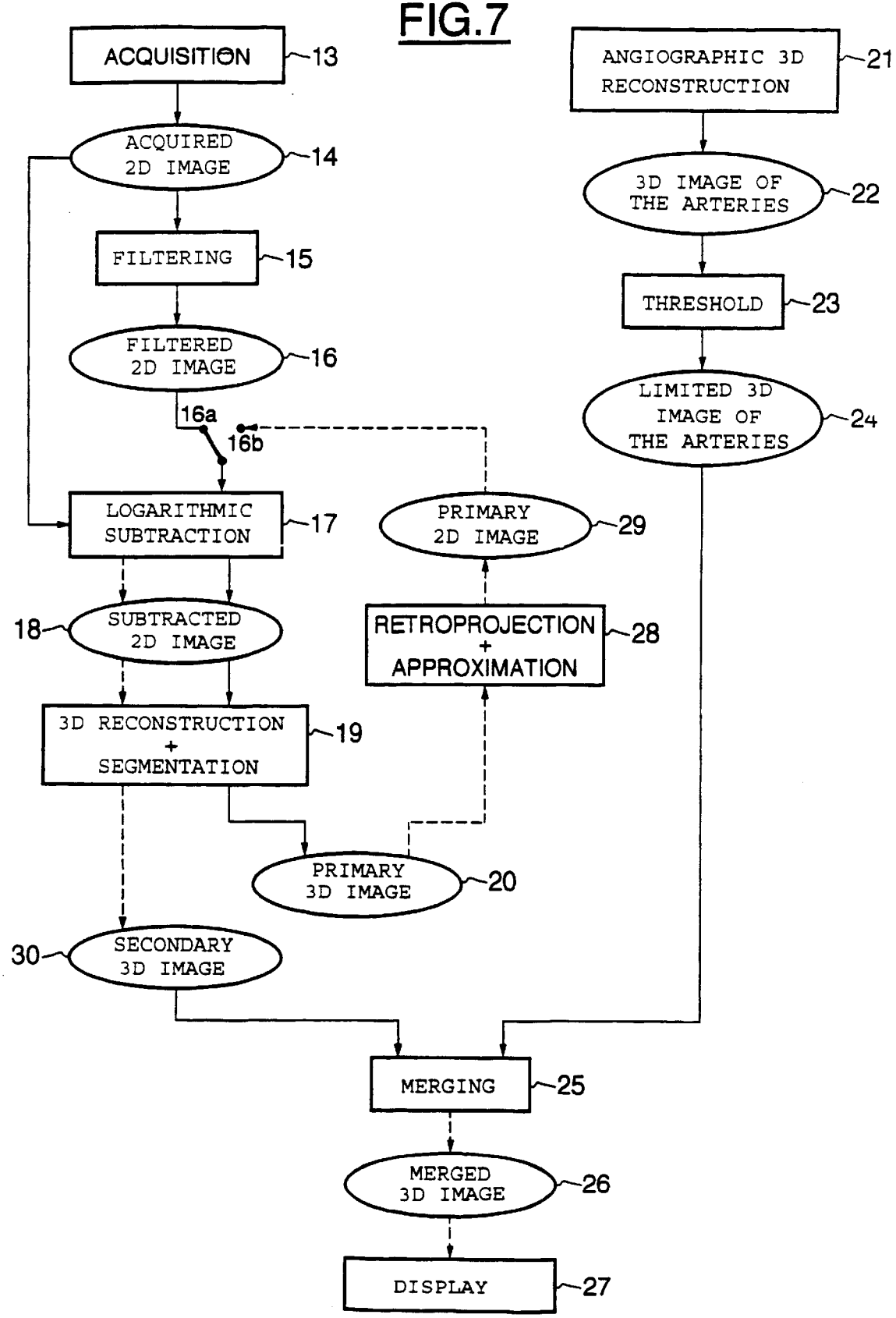
FIG. 7 is a flow chart of another embodiment of the method.

FIG. 7 is a flow chart containing all the elements of FIG. 5. It presents a variant between the logarithmic subtraction stage 17 and merging stage 25. In fact, stages 17 and 19 are carried out twice, a first time, identical to FIG. 5, through wiring 16a so as to obtain the primary three-dimensional image 20. But, in contrast to FIG. 5, the primary three-dimensional image undergoes a back projection 28 on the acquired two-dimensional images 14, in order to determine the location of the coils on those acquired two-dimensional images 14. An approximation of the locations is also made in the course of stage 28. Surfaces possibly above the locations so determined are taken into account. The approximation consists of replacing the intensity of those surface with an intensity obtained by approximating a polynomial function from the intensities of the surrounding pixels. The two-dimensional image 29 obtained does not contain the coils 3. Stages 17 and 19 are therefore carried out a second time by means of wiring 16b so as to obtain a secondary three-dimensional image 30 showing the coils 3 in the same spatial arrangement as the primary three-dimensional image 20, but with better precision as to the intensity levels of the voxels.

A merging is then made from three-dimensional images 30 and 24, following the same criteria as those used for the merging of FIG. 5.

FIG. 8 illustrates a method based on that of FIG. 7. By comparison with FIG. 7, stages 21 and 23 concerning angiographic three-dimensional image reconstruction are not carried out, just like merging stage 25. Stage 19 is split into two stages 19a and 19b. Identical to the method of FIG. 7, a first application of stages 17. 19a and 19b (stage 19) is made from the acquired two-dimensional images 14 and filtered two-dimensional images 16 by means of wirings 14a and 16a in order to determine the primary three-dimensional image 20. Stages 17 and 19a are then carried out a second time, without stage 19b, on the one hand, from the two-dimensional image 29 obtained by back projection and approximation 28 by means of wiring 16b and, on the other, in contrast to the method of FIG. 7, from a two-dimensional image 32 containing the coils 3 and the arteries by means of wiring 14b. The two-dimensional images 32 are obtained in the course of an acquisition 31 following an injection of opaque medium into the arteries.

The second application of stages 17 and 19 makes it possible to obtain a tertiary three-dimensional image 33 that can be directly visualized in the course of stage 27, for this three-dimensional image 33 shows the coils 3 and the arteries.

The present invention concerns a method resulting in the visualization of a three-dimensional image of coils and arteries. An operator can thus see the spatial arrangement of the coils in the arteries.

Various modifications in structure and/or steps and/or function may be made by one skilled in the art without departing from the scope of the invention.

What is claimed is:

1. A method of reconstruction of a three-dimensional image of elements of sharp contrast from a set of two-dimensional images of an object containing the elements of sharp contrast, in which, for each different position of an X-ray camera around the object, a two-dimensional image is taken, and the use of an algorithm for reconstruction of the three-dimensional image is preceded by a stage of filtering of the set of two-dimensional images.

2. The method according to claim 1 wherein the filtering of each acquired two-dimensional image is of low-pass type, so as to obtain a filtered two-dimensional image no longer containing the elements of sharp contrast, and in that after filtering, a logarithmic substraction is carried out between that image no longer containing the elements of sharp contrast and the acquired two-dimensional image, in order to maintain only the said elements of sharp contrast.

3. The method according to claim 1 wherein the low-pass filtering on an acquired two-dimensional image comprises the steps of:
   taking the acquired two-dimensional image,
   determining its average,
   expanding the acquired two-dimensional image in order to eliminate undesired objects of sharp contrast and small size in relation to the said elements of sharp contrast, and
   taking the maximum between the acquired two-dimensional image expanded and the average of the acquired two-dimensional image, in order to obtain a filtered two-dimensional image lacking any element and object of sharp contrast.

4. The method according to claim 2 wherein the low-pass filtering on an acquired two-dimensional image comprises the steps of:
   taking the acquired two-dimensional image,
   determining its average,
   expanding the acquired two-dimensional image in order to eliminate undesired objects of sharp contrast and small size in relation to the said elements of sharp contrast, and
   taking the maximum between the acquired two-dimensional image expanded and the average of the acquired two-dimensional image, in order to obtain a filtered two-dimensional image lacking any element and object of sharp contrast.

5. The method according claim 1 wherein the elements are prostheses.

6. The method according to claim 5 wherein after the reconstruction of three-dimensional images containing prostheses, a hysteresis segmentation of that three-dimensional image is made, so as to eliminate unnecessary voxels and to solely visualize said prostheses in a primary three-dimensional image.

7. The method according to claim 6 wherein for each prosthesis:
   a back projection of the primary three-dimensional image is made on the acquired two-dimensional images in order to determine the pixels representing the prosthesis on the images,
   an approximation is made by replacing the intensity of each of these pixels with an intensity determined from the intensities of the neighboring pixels in order to obtain primary two-dimensional images lacking the prosthesis,
   a logarithmic subtraction is made between the primary two-dimensional images lacking the prosthesis and the respective acquired two-dimensional images, so as to obtain new two-dimensional images solely containing the prosthesis, and
   a three-dimensional image reconstruction is made, followed by an hysteresis segmentation from new two-dimensional images, in order to obtain a secondary three-dimensional image solely containing the prosthesis.

8. The method according to claim 6 wherein a reconstruction of the angiographic three-dimensional image of the arteries is made independently and merging is carried out between the primary or secondary three-dimensional image containing the prosthesis and the three-dimensional image containing arteries so as to obtain a merged three-dimensional image showing the spatial distribution between the arteries and the prosthesis.

9. The method according to claim 5 wherein a reconstruction of the angiographic three-dimensional image of the arteries is made independently and merging is carried out between the primary or secondary three-dimensional image containing the prosthesis and the three-dimensional image containing arteries so as to obtain a merged three-dimensional image showing the spatial distribution between the arteries and the prosthesis.

10. The method according to claim 8 wherein in the course of merging, when a voxel in the three-dimensional image containing the arteries has an intensity different from the one having the equivalent voxel in the three-dimensional image containing the prosthesis, the highest intensity is attributed to the voxel resulting from merging.

11. The method according to claim 8 wherein before merging of the primary or secondary three-dimensional image containing the prosthesis with the three-dimensional image containing the arteries, voxels having a low attenuation value are eliminated on the three-dimensional image containing the arteries by maintaining only a predetermined number of voxels of high attenuation value.

12. The method according to claim 8 wherein before merging of the primary or secondary three-dimensional image containing the prosthesis with the three-dimensional image containing the arteries, voxels having a low attenuation value are eliminated on the three-dimensional image containing the arteries by maintaining only a predetermined number of voxels of high attenuation value.

13. The method according to claim 7 wherein before merging of the primary or secondary three-dimensional image containing the prosthesis with the three-dimensional image containing the arteries, voxels having a low attenuation value are eliminated on the three-dimensional image containing the arteries by maintaining only a predetermined number of voxels of high attenuation value.

14. The method according to claim 6 wherein for each prosthesis:

a back projection of the primary three-dimensional image is made on the acquired two-dimensional images in order to determine pixels representing the prosthesis on said images, an approximation is made by replacing the intensity of each of these pixels with an intensity determined from the intensities of the neighboring pixels in order to obtain primary two-dimensional images lacking the prosthesis, a logarithmic subtraction is made between the primary two-dimensional images lacking the prosthesis and two-dimensional images containing the arteries and the prosthesis acquired after injection of the medium opaque to X-rays, so as to obtain new two-dimensional images containing the arteries and the prosthesis, and a three-dimensional image reconstruction is made from the new two-dimensional images in order to obtain a tertiary three-dimensional image containing the arteries and the prosthesis.

15. A method of reconstruction of a three-dimensional image of elements of sharp contrast from a set of two-dimensional image of an object containing the elements of sharp contrast comprising the steps of:

(a) acquiring a plurality of two dimensional images of the object;

(b) filtering each of the acquired two-dimensional images to obtain a two-dimensional image no longer containing the elements of sharp contrast;

(c) performing a subtraction between the images no longer containing the elements of sharp contrast and the acquired two-dimensional image in order to maintain only the elements of sharp contrast; and (d) reconstructing the three-dimensional image from the filtered and subtracted two-dimensional images.

16. The method according to claim 15 comprising the steps of:

(a) acquiring a first and second series of different two-dimensional images;

(b) independently reconstructing a three-dimensional image from the second series of acquired images;

(c) merging the first and second three-dimensional images to obtain a third three-dimensional image showing spatial distribution of features in the first and second three-dimensional images.

* * * * *